US008675983B2

(12) United States Patent
Yahil

(10) Patent No.: US 8,675,983 B2
(45) Date of Patent: Mar. 18, 2014

(54) METHOD TO DETERMINE A PIXON MAP IN ITERATIVE IMAGE RECONSTRUCTION AND SPECTRAL ANALYSIS

(75) Inventor: Amos Yahil, Stony Brook, NY (US)

(73) Assignee: ImageRecon LLC, Stony Brook, NY (US)

( * ) Notice: Subject to any disclaimer, the term of this patent is extended or adjusted under 35 U.S.C. 154(b) by 121 days.

(21) Appl. No.: 13/448,363

(22) Filed: Apr. 16, 2012

(65) Prior Publication Data

US 2012/0263393 A1 Oct. 18, 2012

Related U.S. Application Data

(60) Provisional application No. 61/476,012, filed on Apr. 15, 2011.

(51) Int. Cl.
G06K 9/40 (2006.01)
(52) U.S. Cl.
USPC .......................................................... 382/264
(58) Field of Classification Search
USPC ......... 382/100, 128, 131, 154, 173, 181, 254, 382/260, 265, 275–276; 378/4
See application file for complete search history.

(56) References Cited

U.S. PATENT DOCUMENTS

| | | | |
|---|---|---|---|
| 5,912,993 A | 6/1999 | Puetter et al. | |
| 6,353,688 B1 | 3/2002 | Puetter et al. | |
| 6,490,374 B2 | 12/2002 | Puetter et al. | |
| 6,895,125 B2 | 5/2005 | Puetter et al. | |
| 6,993,204 B1 | 1/2006 | Yahil | |
| 7,928,727 B2 | 4/2011 | Vija et al. | |
| 8,014,580 B2 | 9/2011 | Vija et al. | |
| 8,058,601 B2 | 11/2011 | Vija et al. | |
| 8,086,011 B2 | 12/2011 | Vija et al. | |
| 8,090,179 B2 | 1/2012 | Vija et al. | |
| 8,103,487 B2 | 1/2012 | Vija et al. | |
| 8,160,340 B2 * | 4/2012 | Vija et al. | 382/131 |
| 8,184,876 B2 * | 5/2012 | Vija et al. | 382/128 |
| 8,369,313 B2 * | 2/2013 | Lu et al. | 370/352 |
| 8,380,469 B2 * | 2/2013 | Vija et al. | 703/2 |
| 2007/0274605 A1 | 11/2007 | Yahil | |
| 2010/0119166 A1 | 5/2010 | Puetter | |

OTHER PUBLICATIONS

International Search Report and Written Opinion for PCT/US2012/033852 issued Jul. 12, 2012, 7 pages.
Puetter, R.C. and Yahil, A. et al., "The Pixon Method of Image Reconstruction", Astronomical Data Analysis and Software VIII, ASP Conference Series vol. 172, 1999, D.M. Mehringer, R.L. Plante, and D.A. Roberts, eds.; pp. 307-316.
Puetter, R.C., et al., "Digital Image Reconstruction: Deblurring and Denoising", Annual Review Astronomy and Astrophysics, 2005, 143:139-194, published on-line Jun. 16, 2005.

* cited by examiner

*Primary Examiner* — Jose Couso
(74) *Attorney, Agent, or Firm* — Eleanor M. Musick; Procopio, Cory, Hargreaves & Savitch LLP

(57) ABSTRACT

A method for iterative reconstruction of an object containing noise using the pixon method determines the pixon map from a variable that is used to update the object in the iteration. The updating variable is based on an optimized merit function, and smoothes the updating variable during each iteration. The updating variable depends on the reconstruction method, but is typically a gradient of a merit function or a multiplicative update factor. The updated object can optionally also be further smoothed at the end of the iteration, using the pixon map determined during the iteration.

21 Claims, 12 Drawing Sheets

METHOD TO DETERMINE A PIXON MAP IN ITERATIVE IMAGE RECONSTRUCTION AND SPECTRAL ANALYSIS

RELATED APPLICATIONS

The present application claims the priority of U.S. Provisional Application No. 61/476,012, filed Apr. 15, 2011, the disclosure of which is incorporated herein by reference in its entirety.

FIELD OF THE INVENTION

The present invention relates to a method for signal reconstruction and enhancement, and more specifically, to a method for adaptively reducing the noise in an input object.

BACKGROUND OF THE INVENTION

Optimal extraction of data contained within a signal requires the removal of defects such as noise and instrumental limitations. A key area in which optimized extraction and reconstruction of data is sought is the field of image enhancement. Even when instruments can be made virtually noise-free, instrumental signatures related to finite spatial, spectral, or temporal resolution remain. At this point, image reconstruction is required to remove the instrumental signatures. Applications of image enhancement, and the sources of noise and other factors that can negatively impact data extraction, cover a wide range including astronomical observation and planetary exploration, where sources can be faint and atmospheric interference introduces noise and distortion, military and security surveillance, where light can be low and rapid movement of targets result in poor contrast and blur, medical imaging, which often suffers from lack of clarity, and video images, where transmission and instrument limitations, and the need for real time response, can negatively impact image sharpness and detail.

Digital image processing has been developed to provide high-quality, robust reconstructions of blurry and noisy data collected by a variety of sensors. The field exists because it is impossible to build imaging instruments that produce consistently sharp pictures uncorrupted by measurement noise. Nonetheless, it is possible to mathematically reconstruct the underlying image from the nonideal data obtained from real-world instruments so that information present but hidden in the data can be extracted with less blur and noise. Many such methods utilize a process in which a predictive model is constructed and compared to the data to evaluate the accuracy of the model's fit to the data.

Throughout this written description, "data" refers to any measured quantity, from which an unknown "image" is estimated through the process of image reconstruction. The term image denotes either the estimated solution or the true underlying image that gives rise to the observed data. The discussion usually makes clear which context applies; in cases of possible ambiguity "image model" is used to denote the estimated solution. Note that the data and the image need not be similar and may even have different dimensionality, e.g., tomographic reconstructions seek to determine a 3D image from projected 2D data. An alternative term to image is "object", which conveys the idea that the model can be more general than an image. The two terms are used synonymously hereafter.

Statisticians have long sought to restrict the parameters used to fit data in order to improve the interpretation and predictive accuracy of the fit. The standard techniques are subset selection, in which some of the parameters are found to be unimportant and are excluded from the fit (e.g., Miller 2002), and ridge regression, in which the values of the parameters are constrained by adding a regularization term to the merit function used in the fit (e.g., Tikhonov 1963). Tibshirani (1996) combined the two methods in a technique known as Least Absolute Shrinkage and Selection Operator (LASSO).

The need to limit the number of parameters in a fit is imperative for underdetermined or poorly determined problems, in which the number of parameters is greater than or comparable to the number of data points. As already emphasized by the originators of the statistical methods of minimum least squares (Gauss 1809) and maximum likelihood (Fisher 1912, 1922), these methods are only valid in the asymptotic limit in which the number of data points greatly exceeds the number of fitted parameters. Away from this asymptotic limit, noise is fitted as signal, and the fit loses its interpretative and predictive power.

Puetter er al (2005) review numerous reconstruction algorithms in current use, including iterative image reconstruction methods, which iteratively fit image models to the data. Many prior art iterative schemes that are designed to converge to the maximum-likelihood solution converge slowly, even when they are terminated early to avoid overfitting. Convergence can be achieved more quickly by using the Hessian matrix of second-order partial derivatives of the merit function with respect to the variable (Hesse 1876). Unfortunately, even using this approach, the Hessian matrix is too large to be computed when dealing with the large-scale problems that are frequently encountered in image reconstruction, e.g., where the image contains a large number of pixels with significant emission. In such cases, the matrix elements can number in the trillions. Matrices of this size simply cannot be processed by present-day computers, or even stored in memory.

The desire to restrict the number of parameters in underdetermined or poorly determined problems—sparsity, as it is called today—is based on the more abstract concept of minimal complexity (Solomonoff 1964; Kolmogorov 1965; Chaitin 1966), which goes back to the medieval work of William of Ockham, who advocated parsimony of postulates. Put simply, other things being equal, a simpler explanation is better than a more complex one.

Finding a sparse solution, e.g., by adding an $l_0$ norm regularization term to the merit function, is an N-P hard problem, in which the computational effort increases more rapidly than any polynomial in the number of parameters. This has led to the replacement of the $l_0$ norm with an $l_1$ norm (Chen, Donoho & Saunders 1999), so that the optimization of the fit with respect to the parameters becomes a solvable convex problem. Candès, Romberg & Tao (2004) went a step further and showed how randomly to reduce the amount of data required for the fit under a condition of incoherence, a technique known as compressed sensing. Donoho (2006) showed that, under a similar condition of incoherence among the basis functions used in the parameterization, the minimal $l_1$ norm solution is also the sparsest solution.

The disadvantages of the $l_1$ norm methods are twofold. First, many problems of interest simply do not satisfy the incoherence condition and are unsuitable for $l_1$ norm methods. Second, even when they do satisfy the incoherence condition, large-scale problems require excessive computational effort. Thus, although they are convex problems and solvable in principle, they cannot be applied in practice to present-day problems with millions or more parameters, a problem that also plagues traditional statistical methods. Donoho et al (2006) discuss how to apply randomness more efficiently to such large-scale problems without the use of an $l_1$ norm.

The pixon method is an efficient technique to obtain minimally complex solutions of pixel-based data—including large-scale problems—without demanding strict sparsity and without the incoherence condition required by methods utilizing the $l_1$ norm (See, e.g., Piña & Puetter 1993; Puetter & Yahil 1999; Puetter, Gosnell & Yahil 2005, and U.S. Pat. Nos. 5,912,993, 6,353,688, 6,490,374, 6,895,125, 6,993,204, 7,863,574, 7,928,727, 8,014,580, 8,026,846, 8,058,601, 8,058,625, 8,086,011, 8,090,179, 8,094,898, 8,103,487, the disclosures of which are incorporated herein by reference). The pixon method is therefore useful for large-scale underdetermined or poorly determined inverse problems such as image reconstruction or spectral analysis. Minimum complexity is achieved by adaptively smoothing at each pixel location by the widest kernel among a library of kernels, such that smoothing with this and all narrower kernels provides an adequate fit to the data footprint of the pixel under consideration. The map specifying which kernel to use at each pixel is called the pixon map.

In its current form, a pixon reconstruction consists of three steps. First, it reconstructs a "pseudoimage" without any pixon constraints. Second, this pseudoimage is used to determine the pixon map. Third, the final image is obtained by a constrained reconstruction guided by the pixon map. Steps two and three can be repeated a number of times, but this is usually not necessary in practice, provided that a reasonable pseudoimage is obtained in the first step. See, Puetter & Yahil (1999), Puetter et al (2005) and U.S. Pat. Nos. 5,912,993, 6,353,688, 6,490,374, 6,895,125, 6,993,204, 7,863,574, 7,928,727, 8,014,580, 8,058,601, 8,058,625, 8,086,011, 8,090,179, 8,094,898, and 8,103,487 for more complete discussions of the pixon method and its application.

FIG. 2 illustrates a generic imaging system 200 with an imaging detector 210, and a pixon reconstruction unit 220. The reconstruction is based on a pixon method that uses a pixon map P, which interacts with a pixon reconstruction algorithm 230. The pixon method refers to a method that smoothes each point in object space (hereafter an "object point") by assigning a shape or volume to each object point as a basis for the pixon smoothing. The object space is the space in which the result of the image reconstruction is defined and which corresponds to a domain that was imaged using the imaging system 200. (It should be noted that "image space" is a synonymous term to "object space", and the two terms are hereafter used interchangeably.) A corresponding data space is given by the data points measured with the imaging detector 210.

The pixon method provides high quality reconstruction of an image object I in object space from a measured data set d in data space. As a spatially adaptive reconstruction method, the pixon method applies a data-motivated smoothing operation to every object point. In doing so, the pixon method uses the principal of minimum complexity when assigning to every object point a pixon kernel function, which is the basis for the smoothing operation. Within the pixon reconstruction unit 220, the pixon map P defines which of the pixon kernel functions is assigned to each of the object points.

In the imaging system 200, the imaging detector 210 detects and communicates the measured data set d to the pixon reconstruction unit 220. The pixon reconstruction unit 220 uses the specially-adapted pixon reconstruction algorithms 230 to reconstruct the acquired data set d into an image object I. In doing so, the pixon reconstruction algorithm 230 uses a system matrix H to describe the properties of the imaging system 200, and to estimate an iteratively improved image object by adjusting the data model, which is the basis for the image object I. The image object I is, for example, displayed on a display 240 using well-known rendering techniques.

For every object point, the pixon map P provides a pixon kernel function that is determined on the basis of a minimum complexity method. This pixon kernel function is used in a pixon smoothing operation applied in object space.

The pixon method can also enable compressed sensing in the form of super-resolution, utilizing the normegativity of the image and minimum complexity to reconstruct an image with finer pixels than those with which the data are obtained. This is not a violation of the sampling theorem due to Nyquist (1928) and Shanon (1949) because of the extra conditions of normegativity and minimum complexity (e.g., Puetter et al 2005). Spatial frequencies beyond the diffraction limit, which are truncated in the data, can similarly be reconstructed in the image.

FIG. 3 illustrates an exemplary process flow of the pixon method. Pixon smoothing is applied sequentially to a standard reconstruction algorithm.

Using a standard reconstruction algorithm, the input image is fitted to a measured data set d (step 300). In accordance with the above discussed use of the pixon kernel operator K, the resulting estimate of the image is called a pseudoimage. The pixon map P is determined using the pseudoimage and the measured data set d (step 310). The pseudoimage is also the initial object for the pixon smoothing operation (step 320). During the pixon smoothing operation (step 320), each object point of the pseudoimage is smoothed over a pixon kernel function. (In some variations of existing pixon methods, the pixon map can also be updated in each iteration by computing from the updated image.

Iterative image reconstruction methods iteratively fit image models to measured data and thus minimize the effect of noise on the final image. The result of a reconstruction algorithm is an approximated image that is fit to the measured data set d according to the rules of the algorithm.

In the pixon method, an approximated image can be used as an input object for pixon smoothing, for pixon reconstruction, and for the determination of the pixon map.

The pixon method includes a search for the broadest possible pixon kernel functions at each point in object space that together support an adequate fit of an object to the measured data set d. In particular, the pixon map assigns to each object point a specific pixon kernel function.

There can be drawbacks to the step of first computing a pseudoimage from which the pixon map can then be determined. This process requires more computations and runs the risk of introducing artifacts into the pseudoimage, which can bias the pixon map and hence the final image reconstruction. Furthermore, the determination of the pixon map works less well if the transformation from object space to data space is nonlocal (Bhatnagar & Cornwell 2004). For example, in interferometry and magnetic-resonance imaging, the data are the Fourier transforms of the image (plus noise), with each Fourier wave (basis function of the image) spreading over the entire image. Another example is the partially nonlocal transformation in tomography. The data are 2D projections of a 3D image (plus noise), a transformation which is local transverse to the projection direction but nonlocal along the projection direction.

In view of the foregoing, there is a need for an improved method for determining the pixon map within the pixon method.

SUMMARY OF THE INVENTION

According to the invention herein, the above-mentioned difficulties of the three-stage pixon method are avoided by computing and updating the pixon map during the iteration. The improved approach determines the pixon map from a variable that is used to update the image in the iteration, i.e., an "updating variable", and smoothes this updating variable during the iteration. The updated image is usually also further smoothed at the end of the iteration, using the pixon map determined during the iteration. By contrast, the existing pixon methods determine the pixon map from the image after it has been updated and proceed to smooth the image with that pixon map.

According to the present invention, the updating variable depends on the reconstruction method, but is typically a gradient of a merit function or a multiplicative update factor (e.g., Puetter et al 2005). This updating variable is smoothed by the pixon kernels, and the kernel selected at each image location is the widest one for which the ratio between the square of the change in the updating variable due to smoothing and the variance of the updating variable is smaller than a predetermined threshold for it and all narrower kernels. The same kernel is then usually also used to smooth the updated image at that location before proceeding to the next iteration. A further refinement allows "interpolated kernels". In one aspect of the invention, a method for reconstructing an object model from a data set obtained from a physical process, wherein the data set contains noise, comprises: receiving the data set defined in a data space; constructing an object model in an object space wherein the object model comprises a plurality of object points; devising a transformation of the object model from object space to data space resulting in a data model, wherein the transformation corresponds to the physical process by which the data set is obtained; selecting a merit function for determining a fit of a data model to the data set; determining an updating variable of the object model in object space based upon the merit function; smoothing the updating variable to determine a smoothed updating variable by: convolving the updating variable with each of a plurality of pixon kernels; and selecting for each object point of the input object a pixon kernel having a largest size that meets a predetermined minimum criteria; generating a pixon map by assigning indices at each object point of the input object corresponding to the selected pixon kernel; and generating an output comprising a substantially denoised object model based on the indices within the pixon map. In one embodiment, the merit function is determined using a conjugate gradient method and the updating variable is a negradient.

In another aspect of the invention, a non-transitory computer readable medium having included software includes instructions for reconstructing an object model from a data set obtained from a physical process, wherein the data set contains noise, and the instructions comprise: receiving the data set defined in a data space; constructing an object model in an object space wherein the object model comprises a plurality of object points; devising a transformation of the object model from object space to data space resulting in a data model, wherein the transformation corresponds to the physical process by which the data set is obtained; selecting a merit function for determining a fit of a data model to the data set; determining an updating variable of the object model in object space based upon the merit function; smoothing the updating variable to determine a smoothed updating variable by: convolving the updating variable with each of a plurality of pixon kernels; and selecting for each object point of the input object a pixon kernel having a largest size that meets a predetermined minimum criteria; and generating a pixon map by assigning indices at each object point of the input object corresponding to the selected pixon kernel. In an exemplary embodiment, the merit function is determined using a conjugate gradient method and the updating variable is a negradient.

DETAILED DESCRIPTION OF THE INVENTION

Before describing aspects of the present invention, it may be useful to provide a brief description of a suitable computing system environment 100 (FIG. 1) on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purposes or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, telephone systems, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. Those skilled in the art can implement the description and/or figures herein as computer-executable instructions, which can be embodied on any form of computer readable media discussed below.

The invention may also be practiced in distributed computing environments where tasks are performed by remote processing devices that are linked through a communications network. In a distributed computing environment, program modules may be located in both local and remote computer storage media including memory storage devices.

Figure 1:
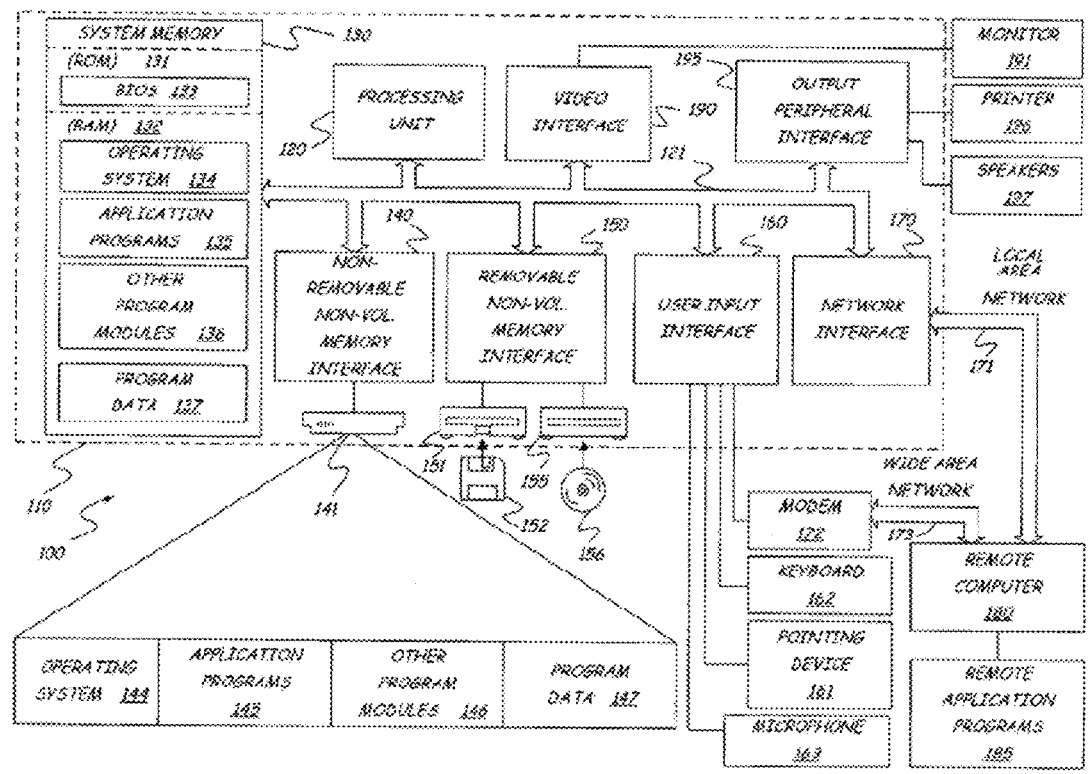
FIG. 1 is a block diagram of a general computing environment in which the present invention can be practiced.
Figure 2:
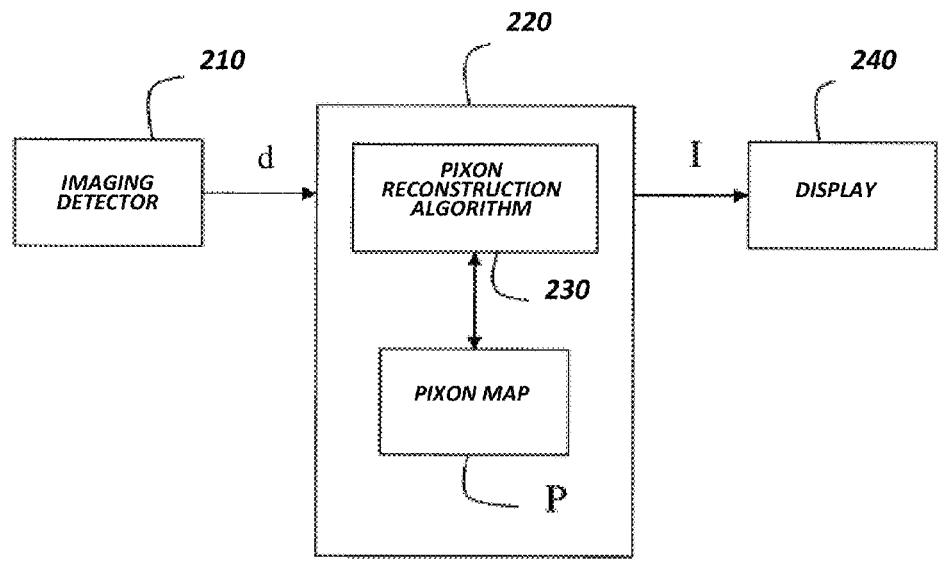
FIG. 2 is an overview of a prior art imaging system based on the pixon method.
Figure 3:
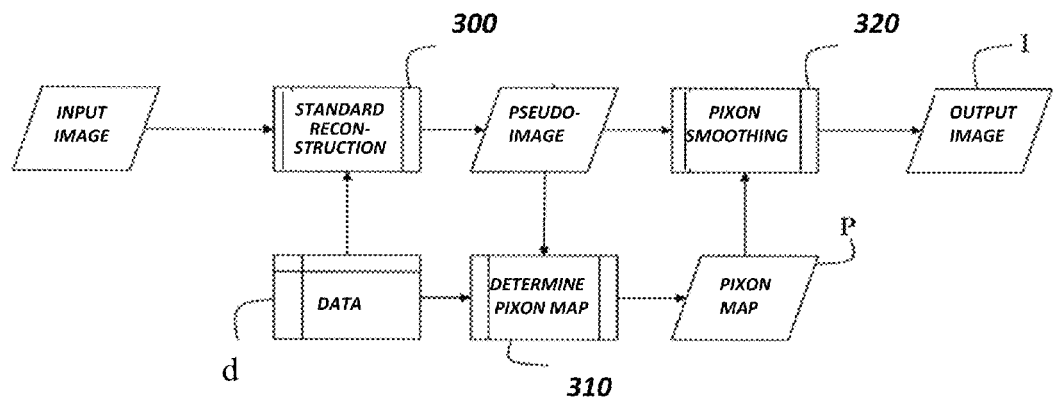
FIG. 3 is a flowchart illustrating an example of image reconstruction using the prior art approach for pixon reconstruction.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163 (which also can represent input provided through a telephone), and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user-input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Within this application, "pixon" is used to indicate that a term, method, object etc. refers to the pixon method, i.e., to the use of object point specific shapes when smoothing an image object as described in U.S. Pat. Nos. 5,912,993, 6,895,125, and other related patents. For example, the assigned shapes are defined by pixon kernel functions, and the pixon map P stores the information about which of the pixon kernel functions is/are assigned to each object point.

A fit to data is the solution to a noisy inverse problem. The data are modeled as $$d = H(I) + \epsilon, \quad (1)$$

where d is an array containing the measured data, I is an array containing the fit parameters, H is the transformation function from parameter space to data space, and $\epsilon$ is an array containing the noise contributions to the data. For purposes of illustration, a notation appropriate to image reconstruction is used in Eq. (1), i.e., d are pixel data and I is the reconstructed image. This example is not intended to be limiting however, because the invention herein has broad applications to any noisy inverse problem that can be solved using the pixon method.

For many applications, the transformation H is linear, and Eq. (1) can be written as $$d = HI + \epsilon, \quad (2)$$

where d and I are treated as vectors, and H as a matrix, known as the system matrix. The following discussion is restricted to the linear case of Eq. (2), but it can be generalized to nonlinear problems by linearizing, i.e., considering a limited image domain in which H(I) is approximately linear.

Note that, in reality, d and I may be multidimensional and need not even have the same dimensionality (e.g., in tomography). But the multidimensional pixels can always be arranged as long vectors, and one can then think of H as a matrix.

The data model $$m = HI = d - \epsilon \quad (3)$$

is the noiseless, signal part of the data. It is also the expectation value of the data $$m = E(d), \quad (4)$$

because the expectation value of the noise can, without loss of generality, be set identically to zero for all data points $$E(\epsilon) = 0. \quad (5)$$

The covariance matrix of the noise is, in general, nonzero and may be a function of position (pixel location) and/or data model value $$V(\epsilon) = V(m). \quad (6)$$

Normally, the data points are independent, so V is a diagonal matrix, but there can also be correlated data, in which case V has nonzero, off-diagonal elements.

Image reconstruction is the inverse problem of solving Eq. (2)—or, more generally, Eq. (1)—for the image I, given the data d, a system matrix H, and a statistical model of the noise $\epsilon$. It is solved by optimizing a merit function of the data, given the data model $$L \equiv L(d|m) = L(d|HI). \quad (7)$$

The choice of merit function depends on the noise statistics. It is usually taken to be the log-likelihood function (LLF), which is related to the maximum likelihood (e.g., Puetter et al 2005).

For Gaussian noise, the LLF reduces to a $\chi^2$ $$L = \chi^2 = \sum_i \sigma_i^{-2} [d_i - m_i]^2 = \sum_i \sigma_i^{-2} \left[ d_i - \sum_\alpha H_{i\alpha} I_\alpha \right]^2 \quad (8)$$

(Gaussian LLF), where the sum over i runs over the data pixels, the sum over $\alpha$ runs over the image pixels, and $\sigma_i$ is the Gaussian standard deviation of the noise in pixel i. The Gaussian LLF has the advantage of being quadratic in the image I, so its gradient with respect to I is linear in I.

For Poisson noise, the LLF is a more complicated nonlinear function $$L = 2 \sum_i [m_i - d_i \ln(m_i)] = 2 \sum_i \left[ \sum_\alpha H_{i\alpha} I_\alpha - d_i \ln\left( \sum_\alpha H_{i\alpha} I_\alpha \right) \right] \quad (9)$$

(Poisson LLF), which can be solved by nonlinear optimization (e.g., Press et all 2007) or by using a surrogate function (Lange, Hunter & Yang 1999). Mighell (1999) proposed, instead, to use a quadratic approximation to the Poisson LLF, which yields an unbiased data model, even in the limit of low counts $$\chi_\gamma^2 = \sum_i [d_i + 1]^{-1} [d_i + \text{Min}(d_i, 1) - m_i]^2 = \quad (10)$$

$$\sum_i [d_i + 1]^{-1} \left[ d_i + \text{Min}(d_i, 1) - \sum_\alpha H_{i\alpha} I_\alpha \right]^2 \text{(Mighell } \chi_\gamma^2\text{)}.$$

There are numerous methods for optimizing the merit function, but few are suitable for large-scale problems, because the system matrix H and its transpose $H^T$ become too big to either compute or store—even using sparse-matrix techniques—and can only be applied as operators. This leaves basically two methods: expectation-maximization (EM) methods (Richardson 1972; Lucy 1974; Dempster, Laird & Rubin 1977; Shepp & Vardi 1982) or conjugate-gradient (CG) methods (Fox, Huskey & Wilkinson 1948; Hestenes & Stiefel 1952; Press et al 2007). Ordered-subsets expectation minimization (OSEM) is an accelerated variant of EM, which uses only a subset of the data in each iteration (Hudson & Larkin 1994). The same procedure can also be applied to CG.

The CG method proceeds by finding successive minima down gradients of the merit function. More precisely, it uses conjugate-gradient directions, which are linear combinations of gradients (e.g., Press et al 2007). A useful concept is that of the negradient, which is defined as half the negative of the gradient of the merit function with respect to the image. For the Gaussian merit function, Eq. (8), the negradient is $$G_\alpha = -\frac{\partial L}{2\partial I_\alpha} = \sum_i H_{i\alpha}\sigma_i^{-2}\left[d_i - \sum_\beta H_{i\beta}I_\beta\right] \quad (11)$$

(Gaussian negradient).

In vector matrix notation, Eq. (11) can be written as $$G = H^T V^{-1} r, \quad (12)$$

where $$r = d - m = d - HI \quad (13)$$

are the residuals, and the variance of the noise is $$V = \text{Diag}(\sigma^2)(\text{Gaussian noise variance}), \quad (14)$$

where $\text{Diag}(\sigma^2)$ denotes the diagonal matrix whose diagonal elements are $\sigma^2$, the squares of the standard deviations.

For Poisson noise, the negradient of the Mighell (1999) $\chi_\gamma^2$ merit function is $$G_\alpha = -\frac{\partial L}{2\partial I_\alpha} = \sum_i H_{i\alpha}[d_i + 1]^{-1}\left[d_i + \text{Min}(d_i, 1) - \sum_\beta H_{i\beta}I_\beta\right] \quad (15)$$

(Mighell negradient).

The Mighell Poisson negradient is also linear in the image I and can be written in the compact vector-matrix notation of Eq. (12), where the residuals are $$r = d + \text{Min}(d,1) - m = d + \text{Min}(d,1) - HI(\text{Mighell residuals}), \quad (16)$$

and the noise variance is $$V = \text{Diag}(d+1)(\text{Mighell noise variance}), \quad (17)$$

The CG method can be greatly accelerated by adding a preconditioner (e.g., Golub & Van Loan 1996; Saad 2003), replacing the gradient of the merit function with $$G = P^{-1}H^T V^{-1} r (\text{Negradient with preconditioner}), \quad (18)$$

where the linear equation $$Px = b \quad (19)$$

can be solved with ease. The resulting method is known as the preconditioned conjugate-gradient (PCG) method.

Constraints can also often be handled by the method of projections onto convex sets (Biemond, Lagendijk & Mersereau 1990). For example, normegativity, $I \geq 0$, can be imposed after each iteration by simply truncating negative components of the image to zero and continuing as though no truncation took place (Puetter et al. 2005). It is also useful, in each iteration, to set to zero any negative conjugate-gradient component at pixels with zero image value at that iteration. This prevents these pixels from participating in the minimization, only to see their resultant negative image values truncated to zero at the end of the minimization.

In the invention herein, the pixon map is determined from the updating variable and not from the image after it has been updated, and the updating variable is smoothed according to this pixon map. This obviates the need to compute an initial pseudoimage, because the pixon map is updated and the updating variable smoothed in each iteration.

For the CG method, the updating variable is taken to be the negradient, Eq. (12). (A preconditioned negradient, Eq. (18), is handled in analogous fashion.) The negradient is smoothed by the kernels in a pixon kernel library, and the kernel selected at each image location is the widest one for which the ratio between the square of the change in the negradient due to smoothing and the variance of the negradient is smaller than a predetermined threshold for it and all narrower kernels.

Specifically, a library of kernel functions is chosen, defined over object space $$K^{(j)}(\tau) j = 1, \ldots, J. \quad (20)$$

The zeroth and first moments of the kernel functions are set to $$\mu_0^{(j)} = \int K^{(j)}(\tau) d\tau = 1, \quad (21)$$

$$\mu_1^{(j)} = \int \tau K^{(j)}(\tau) d\tau = 0, \quad (22)$$

and the second moments are arranged in increasing order $$\mu_2^{(j)} = \int \tau^2 K^{(j)}(\tau) d\tau \mu_2^{(1)} < \mu_2^{(2)} < \ldots < \mu_2^{(J)}, \quad (23)$$

where the integrals are approximated, in practice, by sums over pixels. The second moments are usually designed to form a rising geometric series for optimal characterization of multiscale image structures. Note that dimensionality is important in Eqs. (21)-(23); hence the 1D image pixel indices a used previously are replaced by the vector indices $\tau$ and x.

A series of smoothed negradient changes $\Delta G^{(j)}$ are then obtained by convolving the negradient in turn with each of the kernels and subtracting the original negradient $$\Delta G^{(j)}(x) = \int K^{(j)}(\tau) G(x+\tau) d\tau - G(x). \quad (24)$$

The pixon map is then an image of indices, such that at each pixel, the chosen index is the largest one for which the square of the smoothed negradient change is less than or equal to a multiple $p^2$ of the negradient $$M(x) = \text{Max}_j\{\Delta G^{(j)}(x)^2 \leq p^2 V(G(x))\}, \quad (25)$$

where p is a pixon factor, discussed below. The smoothed negradient is obtained by adding to the negradient at each image pixel the smoothed negradient change corresponding to its pixon index $$\tilde{G}(x) = G(x) + \Delta G^{(M(x))}(x). \quad (26)$$

It will be readily apparent from Eq. (25) that the pixon factor p, which is user adjustable, controls the strength of pixon smoothing. A larger p can allow a larger j to satisfy Eq. (25) at any pixel x, thereby increasing the value of M(x). The result is that the negradient is smoothed more strongly, Eq. (26). By contrast, a smaller p can restrict j to a smaller value, thereby decreasing M(x) and smoothing less. The upshot is that the user can adjust p to set the tradeoff between noise and smoothing. A larger p suppresses noise better at the price of some loss of resolution, while a smaller p preserves resolution better at the price of a higher noise level.

Figure 4:
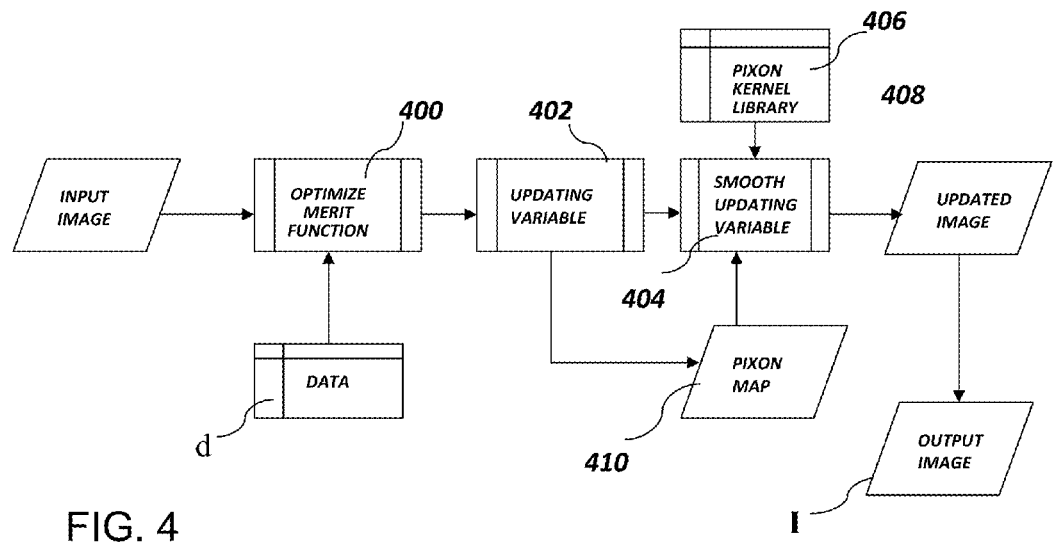
FIG. 4 is a flowchart illustrating an example of image reconstruction using the pixon method according to the present invention.

FIG. 4 illustrates an exemplary flow chart with the improved method for determining the pixon map in an image reconstruction process. In step 400, image reconstruction begins by optimizing a merit function of the data d given the data model of Eq. (7). In the exemplary embodiment, a conjugate gradient (CG) method is used. In step 402, the CG method is used to determine the negradient, which will be used as the updating variable (UV). In step 404, the negradient is convolved with each of the kernels from the pixon kernel library 406 to smooth the UV. The kernel selected at each image location is the widest one for which the ratio between the square of the change in the updating variable due to smoothing and the variance of the updating variable is smaller than a predetermined threshold for it and all narrower kernels. The pixon map 410 is formed using an image of indices of the selected kernels. The same kernel is usually also used to smooth the updated image 408 at that same location before proceeding to the next iteration. Per the existing pixon method, the iteratively improved image is the basis for the output image I, which may be displayed on a display and/or stored in a memory medium.

As noted previously, the example application to image reconstruction is not intended to be limiting, and the improved method is applicable to any signal reconstruction process that uses the pixon method. It is possible to generalize the kernel functions to nonlocal ones, which perform more complicated smoothing. For example, in an image of an apartment building containing many identical windows, it is possible to smooth all the windows in the image together using a single, noncontiguous kernel. Or the data could have no geometrical meaning at all, for example, the prices of stocks, in which case pixelizing is replaced with some indexing scheme for the stocks. The convolution integral, Eq. (24), is replaced for such systems by a more general relation $$G^{(j)}(x) = \int K^{(j)}(x,y) G(x,y) dy \qquad (27)$$

It is usually beneficial to maintain a normalization condition similar to Eq. (21)

$$\mu_0^{(j)} = \int K^{(j)}(x,y) dy \equiv 1 \qquad (28)$$

but Eqs. (22)-(23) are no longer meaningful and have to be replaced by problem-specific conditions. The important point, as far as the pixon method is concerned, is that the kernel functions maintain an order of preference, so that Eqs. (25)-(26) remain meaningful.

A further refinement is to form a continuous pixon map with "fractional indices" and "intermediate kernels" by interpolating between the trial negradients. This smoothes the negradient further and/or allows the use of fewer kernel functions. The intermediate pixon index is defined as $M(x)+\delta(x)$, where $M(x)$ is the integer pixon index specified by Eq. (25), and $\delta(x)$ is the increment that linearly interpolates $\Delta G(x)^2/V(G(x))$ to $p^2$ $$\delta(x) = [p^2 V(G(x)) - \Delta G^{(M)}(x)^2] / [\Delta G^{(M+1)}(v)^2 - \Delta G^{(M)}(x)^2] \quad 0 \leq \delta(x) < 1, \qquad (29)$$

and Eq. (26) is replaced by $$\tilde{G}(x) = G(x) + [1-\delta(x)]\Delta G^{(M(x))} + \delta(x)\Delta G^{(M(x)+1)}, \qquad (30)$$

which corresponds to the use of interpolated kernels $$\tilde{K}(x) = [1-\delta(x)] K^{(M(x))} + \delta(x) K^{(M(x)+1)}. \qquad (31)$$

The iterative CG method proceeds as usual (e.g., Press et al 2007), with the smoothed negradient replacing the original, unsmoothed one.

It is also useful to smooth the continuous pixon map, $M(x)+\delta(x)$, with itself using the interpolated kernels of Eq. (31). The rationale behind this is that the pixon map should be smooth at each location in the image on the scale of the width of the pixon kernel appropriate to the pixon index at that location. Smoothing the pixon map with itself should therefore not introduce significant additional smoothing to the image but may smooth over artifacts, which may have been introduced in the process of computing the pixon map.

The updated image is usually further smoothed after the iteration by the interpolated kernels, Eq. (31). The additional smoothing can, however, lead to some oscillation of the solution with iteration, because kernels that correctly smooth the negradient tend to over-smooth the full image. A simple way to quench the oscillation is to smooth the image with an average of the kernel determined in the current and previous iterations. (For the first iteration, the "previous" kernel is a delta function.)

Figure 5:
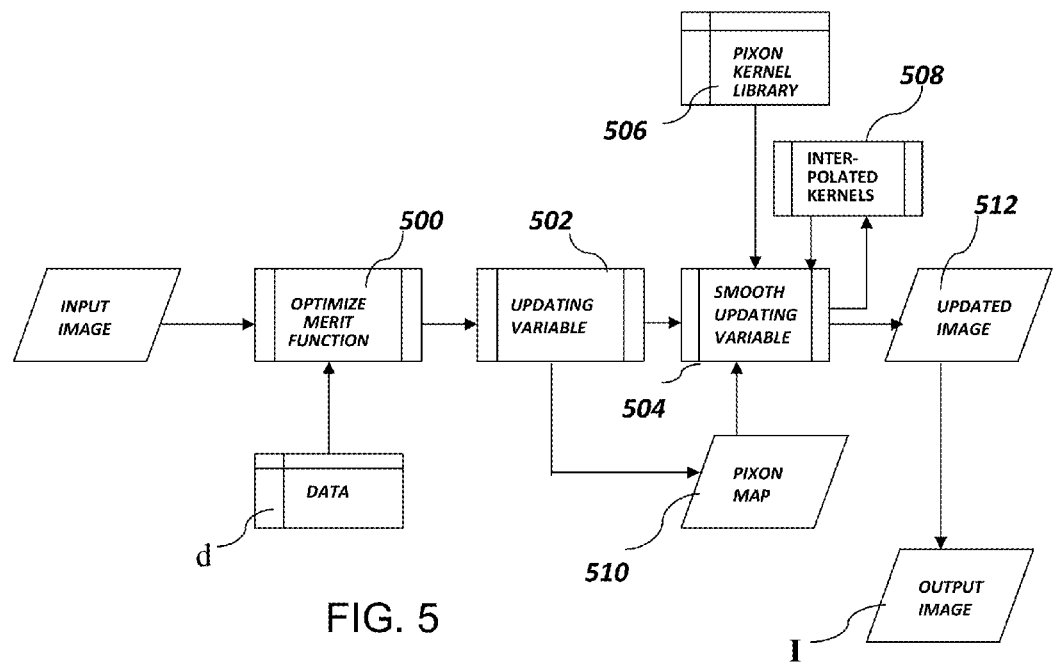
FIG. 5 is a flowchart illustrating an example of an alternative image reconstruction process using the pixon method.

FIG. 5 illustrates an exemplary flow chart with the improved method for determining the pixon map in an image reconstruction process using interpolated kernels. In step 500, image reconstruction begins by optimizing a merit function of the data d given the data model of Eq. (7). In the exemplary embodiment, a conjugate gradient (CG) method is used. In step 502, the CG method is used to determine the negradient, which will be used as the updating variable (UV). In step 504, the negradient is convolved with each of the kernels from the pixon kernel library 506 to smooth the UV. The kernel selected at each image location is the widest one for which the ratio between the square of the change in the updating variable and the variance of the updating variable is smaller than a predetermined threshold for it and all narrower kernels. The pixon map 510 is formed using an image of indices of the selected kernels. After convolution with the kernels from the pixon kernel library has been completed, interpolated kernels may be generated in step 508 to further smooth the UVs that are used to create the pixon map. The same interpolated kernel can be used to smooth the updated image 512 at that location before proceeding to the next iteration. Per the existing pixon method, the iteratively improved image is the basis for the output image I, which may be displayed on a display and/or stored in a memory medium.

The variance of the negradient, which is crucial to the determination of the pixon map, must be computed with care, because the system matrix transpose, $H^T$, Eq. (12), creates correlations among image pixels, even if the data are statistically independent. In some cases, for example when $H^T$ is a Fourier transform, the variance of the negradient can be computed analytically. In other cases, a convenient Monte Carlo method to compute the variance for large-scale problems is to break up the data into a number of nonoverlapping data subsets and to compute the negradient G from Eq. (12) for each subset, replacing the residual r with a random realization of the noise $\epsilon$.

$$G^{(s)} = H^T V^{-1} \epsilon^{(s)} \text{(subset gradient)}, \qquad (32)$$

where the s superscript designates subset.

Since the expectation value of the noise is zero in each pixel, Eq. (5), the expectation value of each subset gradient is also zero $$E(G^{(s)}) = 0. \qquad (33)$$

In the limit of a large number of subsets, the variance of the negradient can therefore be approximated as the sum of the squares of the subset gradients $$V(G) \approx \sum_k (G^{(s)})^2. \qquad (34)$$

The relative error of the Monte Carlo estimate of the variance is $$\Delta(V(G))/V(G) \sim S^{-1/2}, \qquad (35)$$

where S is the number of subsets.

Note that for Gaussian noise, the variance of the negradient depends only on the standard deviation of the noise, $\sigma$, and not on the data or the image. It therefore does not change with iteration and need only be computed once at the beginning of image reconstruction.

The same does not strictly hold for the Poisson negradient of the Mighell $\chi_\gamma^2$, because the terms $[d_i+1]^{-1}$ in Eq. (15) depend on the noisy data in a complicated, nonlinear way. Practice has shown, however, that the variance in these terms is less important than the variance of the residuals, Eq. (16), which can be approximated from the data $$V(r) \approx d(\text{variance of Poisson residuals}). \qquad (36)$$

So, while the approximate variance of the residuals in Eq. (36) does depend on the data, it does not depend on the image. Hence it also does not change with iteration and can also be computed once at the beginning of image reconstruction.

An analogous pixon method can also be applied to EM reconstructions. The problem there, however, is that the variance of the multiplicative update factor (Richardson 1972; Lucy 1974; Shepp & Vardi 1982) changes with iteration and needs to be recomputed at each iteration. This significantly increases the computational effort, in addition to the well known slower resolution recovery of the EM method, which requires significantly more iterations for the same degree of resolution recovery. Taken together, these considerations argue in favor of using the CG method over the EM method.

The following examples of applications of the inventive method to reconstruction of an input signal using the pixon method. These examples are illustrative only and are not intended to be limiting.

EXAMPLES

Example 1

Aperture Synthesis

Aperture synthesis is a type of interferometry that mixes signals from an array of telescopes to produce images having the same angular resolution as an instrument the size of the entire array. At each separation and orientation, the lobe-pattern of the interferometer produces an output which is one component of the Fourier transform of the spatial distribution of the brightness of the observed object. The image (or "map") of the source is produced from these measurements. Aperture synthesis is possible only if both the amplitude and the phase of the incoming signal is measured by each telescope. For radio frequencies, this is possible by electronics, while for optical lights, the electromagnetic field cannot be measured directly and correlated in software, but must be propagated by sensitive optics and interfered optically.

In order to produce a high quality image, a large number of different separations between different telescopes are required (the projected separation between any two telescopes as seen from the radio source is called a baseline)—as many different baselines as possible are required in order to get a good quality image. The number of baselines (nb) for an array of n telescopes is given by $nb=(n^2-n)/2$. For example, among astronomical radio telescopes, the Very Large Array (VLA) has 27 telescopes giving 351 independent baselines at once, while the Atacama Large Millimeter/sub-millimeter Array (ALMA), now under construction, will, when completed, have 66 telescopes, giving 2145 independent baselines. Most aperture synthesis interferometers use the rotation of the Earth to increase the number of baseline orientations included in an observation. Taking data at different times provides measurements with different telescope separations and angles without the need for buying additional telescopes or moving the telescopes manually, as the rotation of the Earth moves the telescopes to new baselines. Further flexibility is provided by allowing the individual telescopes to be moved into different configurations, which gives the array a powerful, variable "zoom".

Other applications of aperture synthesis include interferometric synthetic aperture radar (IfSAR or InSAR), synthetic aperture radar (SAR) and inverse synthetic aperture radar (ISAR), synthetic aperture sonar, beamforming, and synthetic aperture magnetometry.

Originally it was thought necessary to make measurements at essentially every baseline length and orientation out to some maximum: such a fully sampled Fourier transform formally contains the information exactly equivalent to the image from a conventional telescope with an aperture diameter equal to the maximum baseline, hence the name aperture synthesis. It was rapidly discovered that in many cases useful images could be made with a relatively sparse and irregular set of baselines with the help of nonlinear image reconstruction methods.

The pixon method is one such powerful nonlinear image reconstruction method, but its use was hampered by the non-local nature of the Fourier transform (Bhatnagar & Cornwell 2004). The new method of determining the pixon map in the invention herein can overcome this obstacle.

Example 2

Magnetic Resonance Imaging

Magnetic resonance imaging (MRI) is a medical imaging technique used in radiology to visualize detailed internal structures. MRI makes use of the property of nuclear magnetic resonance to image nuclei of atoms inside the body. An MRI machine uses a powerful magnetic field to align the magnetization of some atomic nuclei in the body, and radio frequency fields to systematically alter the alignment of this magnetization. This causes the nuclei to produce a rotating magnetic field detectable by the scanner—and this information is recorded to construct an image of the scanned area of the body. Magnetic field gradients cause nuclei at different locations to rotate at different speeds. By using gradients in different directions, 2D images or 3D volumes can be obtained in any arbitrary orientation. MRI is used to image every part of the body, and is particularly useful for tissues with many hydrogen nuclei and little density contrast, such as the brain, muscle, connective tissue and most tumors.

The body is largely composed of water molecules. Each water molecule has two hydrogen nuclei or protons. When a person is inside the powerful magnetic field of the scanner, the average magnetic moment of many protons becomes aligned with the direction of the field. A radio frequency transmitter is briefly turned on, producing a varying electromagnetic field. This electromagnetic field has just the right frequency, known as the resonance frequency, to be absorbed and flip the spin of the protons in the magnetic field. After the electromagnetic field is turned off, the spins of the protons return to thermodynamic equilibrium and the bulk magnetization becomes re-aligned with the static magnetic field. During this relaxation, a radio frequency signal is generated, which can be measured with receiver coils. Protons in different tissues return to their equilibrium state at different relaxation rates. Different tissue variables, including spin density, T1 and T2 relaxation times and flow and spectral shifts can be used to construct images. By changing the settings on the scanner, this effect is used to create contrast between different types of body tissue or between other properties, as in functional MRI (fMRI) and diffusion MRI.

Information about the origin of the signal in 3D space can be learned by applying additional magnetic fields during the scan. These fields, generated by passing electric currents through gradient coils, make the magnetic field strength vary depending on the position within the magnet. Because this makes the frequency of the released radio signal also dependent on its origin in a predictable manner, the distribution of protons in the body can be mathematically recovered from the signal, typically by the use of the inverse Fourier transform.

A major limitation of MRI is the duration of the scan, which results in increased patient discomfort and lower patient throughput. The MRI scan can be speeded up in one of two ways, or a combination thereof. The scan duration at each radio frequency can be shortened, and/or the number of radio frequencies scanned can be decreased. The former leads to increased noise, while the latter results in incomplete frequency coverage, requiring techniques similar to aperture synthesis. Nonlinear pixon image reconstruction can help reduce the noise and compensate for the missing Fourier data, as shown below.

Unfortunately, there exists no "ground truth" or gold standard for the analysis of in vivo acquired MRI data. A Simulated Brain Database (SBD) was therefore constructed at McGill University (database publicly available on the World Wide Web at bic.mni.mcgill.ca/brainweb; Kwan, Evans & Pike 1999). The SBD contains a set of realistic MRI data volumes produced by an MRI simulator. These data can be used by the neuroimaging community to evaluate the performance of various image analysis methods in a setting where the truth is known.

Currently, the SBD contains simulated brain MRI data based on two anatomical models: normal and multiple sclerosis (MS). For both of these, full 3-dimensional data volumes have been simulated using three sequences (T1-, T2-, and proton-density- (PD-) weighted) and a variety of slice thicknesses, noise levels, and levels of intensity nonuniformity. These data are available for viewing in three orthogonal views (transverse, sagittal, and coronal), and for downloading. Further details about the creation of the SBD are available through public resources.

Figure 6:
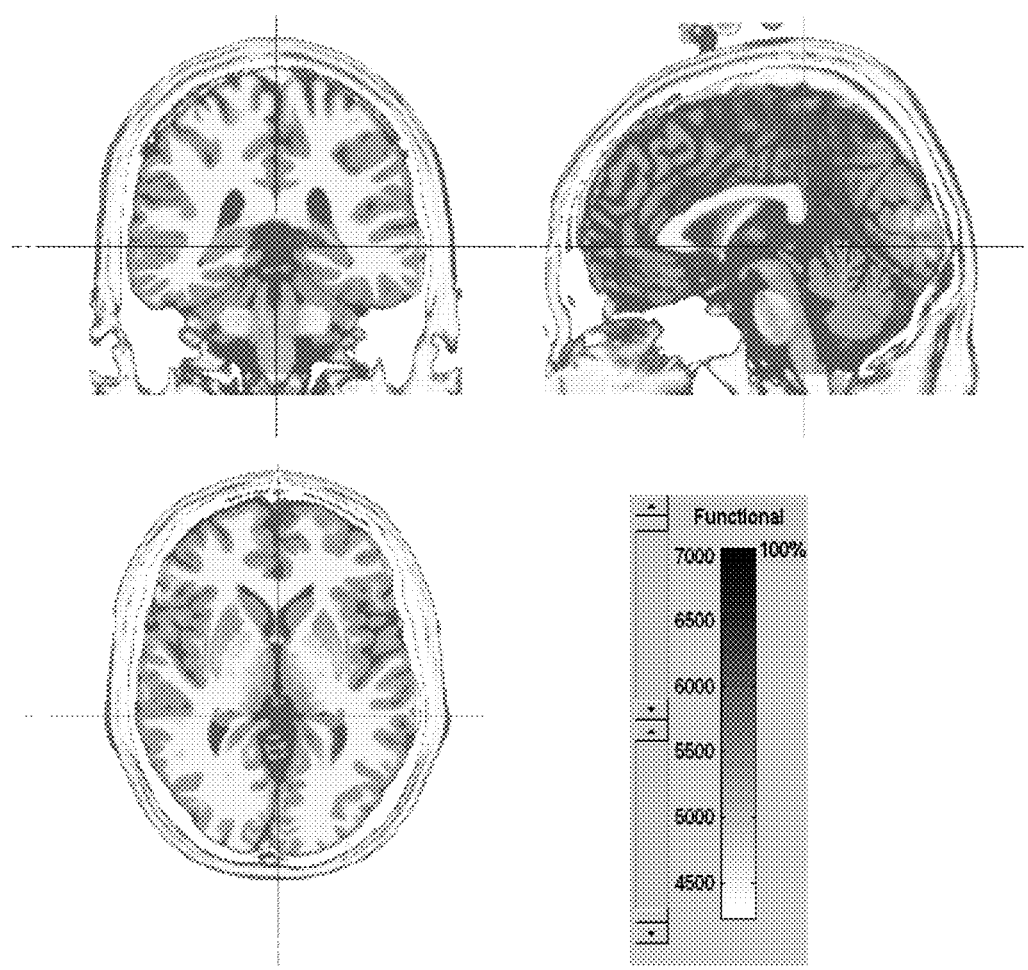
FIG. 6 shows a noiseless, normal, proton-density (PD) SBD "truth" brain image.
Figure 7:
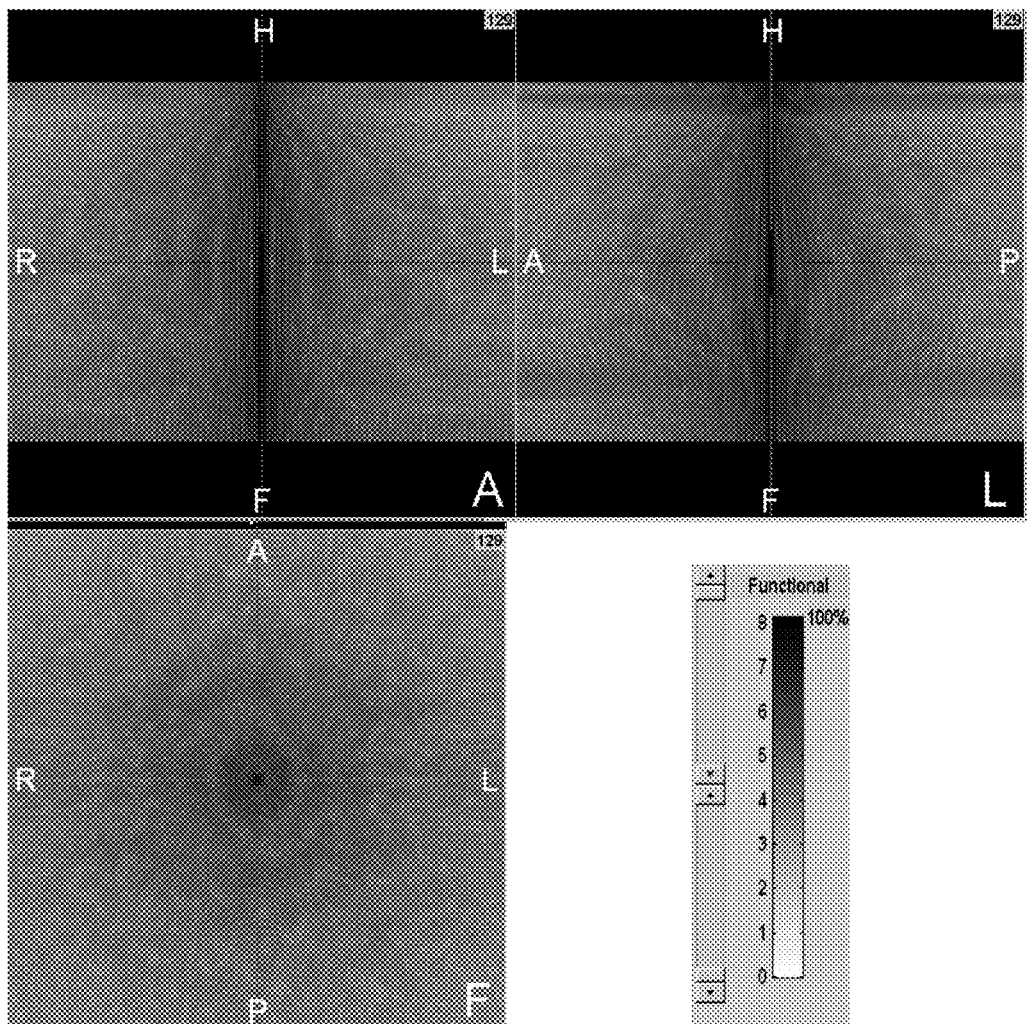
FIG. 7 shows the logarithm (base 10) of the absolute value of the Fourier transform of the image of FIG. 6 into data space.
Figure 8:
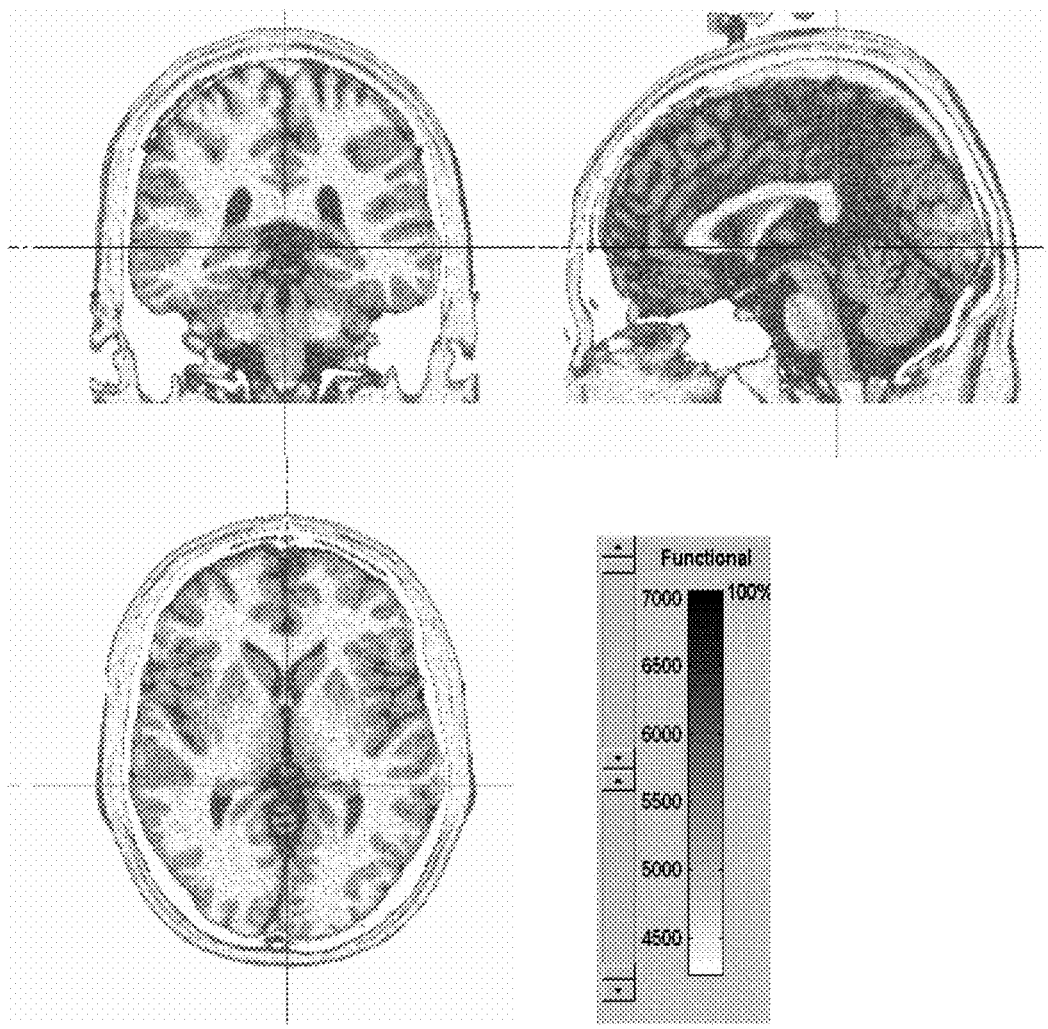
FIG. 8 shows the image of FIG. 6 with random (white) Gaussian noise added to the image with a standard deviation of 3% of the brightest image voxel.
Figure 9:
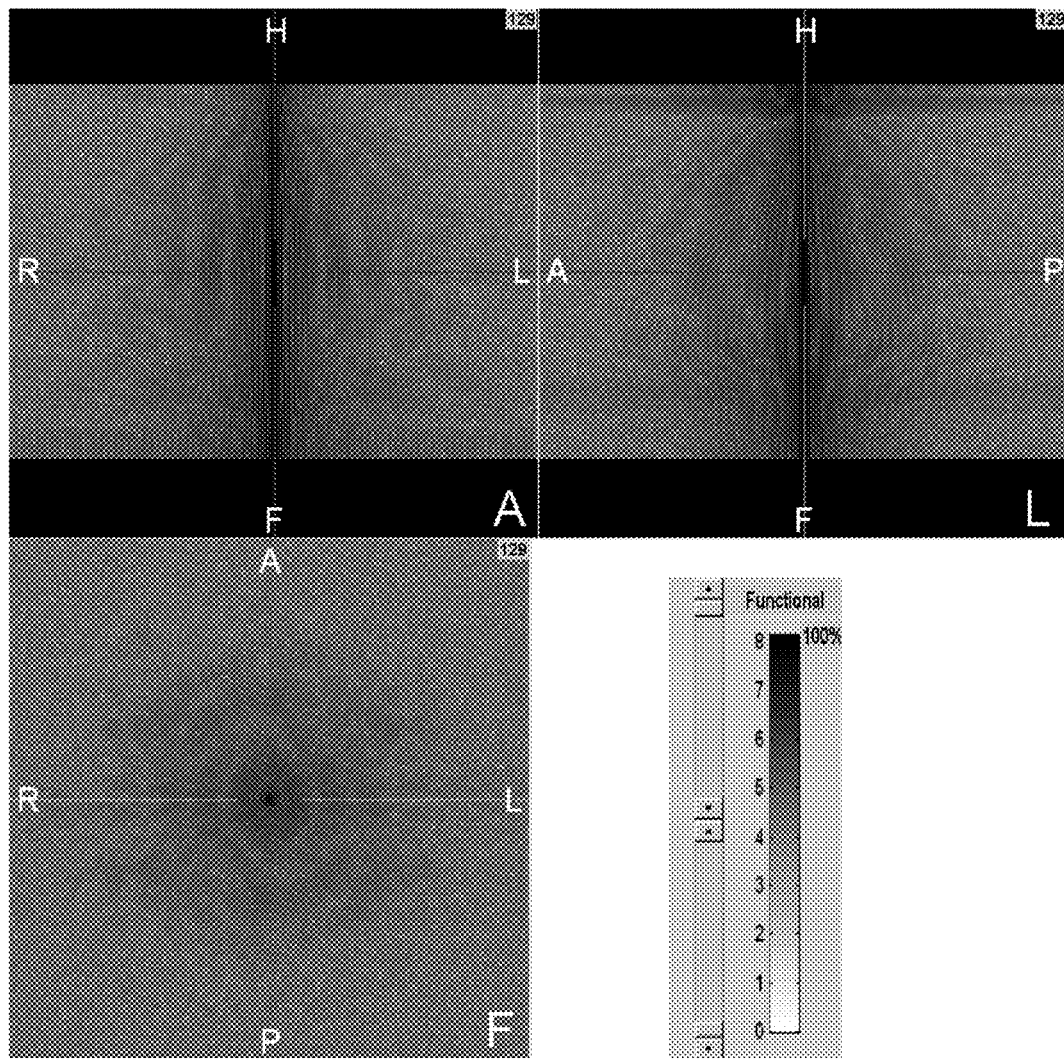
FIG. 9 shows the logarithm (base 10) of the absolute value of the Fourier transform of the image of FIG. 8 into data space.
Figure 10:
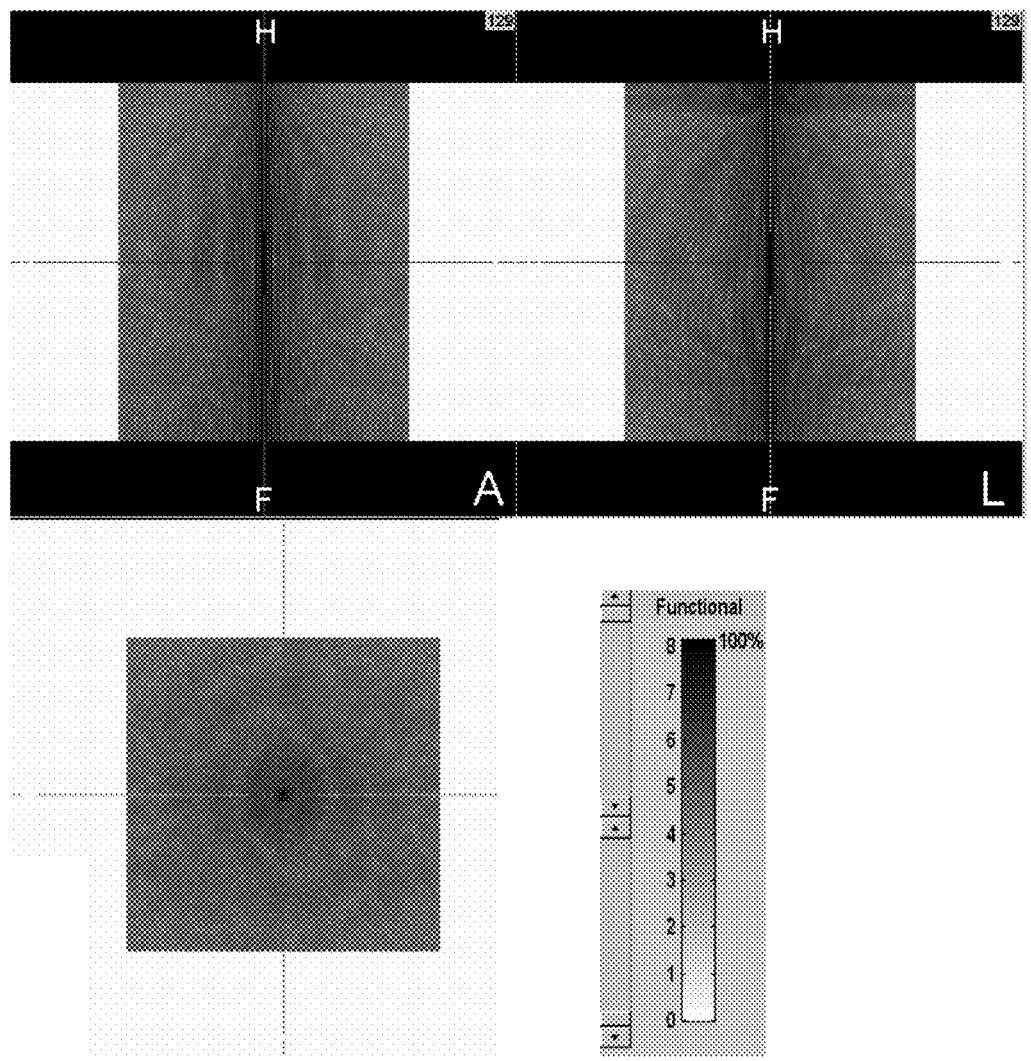
FIG. 10 shows the same data as FIG. 9, with the high frequencies truncated, corresponding to frequency coverage restricted to a third of the available frequencies. The data in FIG. 10 comprise the input to the reconstructions of the image shown in FIGS. 11-14.

FIG. 6 shows a noiseless, normal, proton-density (PD) SBD "truth" brain image, and FIG. 7 shows the logarithm (base 10) of the absolute value of its transform into data space. In both figures the upper panels show a coronal slice (left panel) and a sagittal slice (right panel). The lower panel is a transverse slice. The transformation from object space to data space consisted of 2D Fourier transforms, one transverse slice at a time, and the display was cyclically shifted transversely, in order to display the zero frequency is at the center. FIG. 8 shows the image of FIG. 6 with random (white) Gaussian noise added to the image with a standard deviation of 3% of the brightest image voxel. FIG. 9 shows the Fourier transform of FIG. 8 into data space. Noise is seen to dominate the data at high frequencies (the transverse peripheries of the data displays). FIG. 10 shows the same data as FIG. 9, with the high frequencies truncated, corresponding to frequency coverage restricted to a third of the available frequencies. The data in FIG. 10 comprise the input to the reconstructions of the image.

Figure 11:
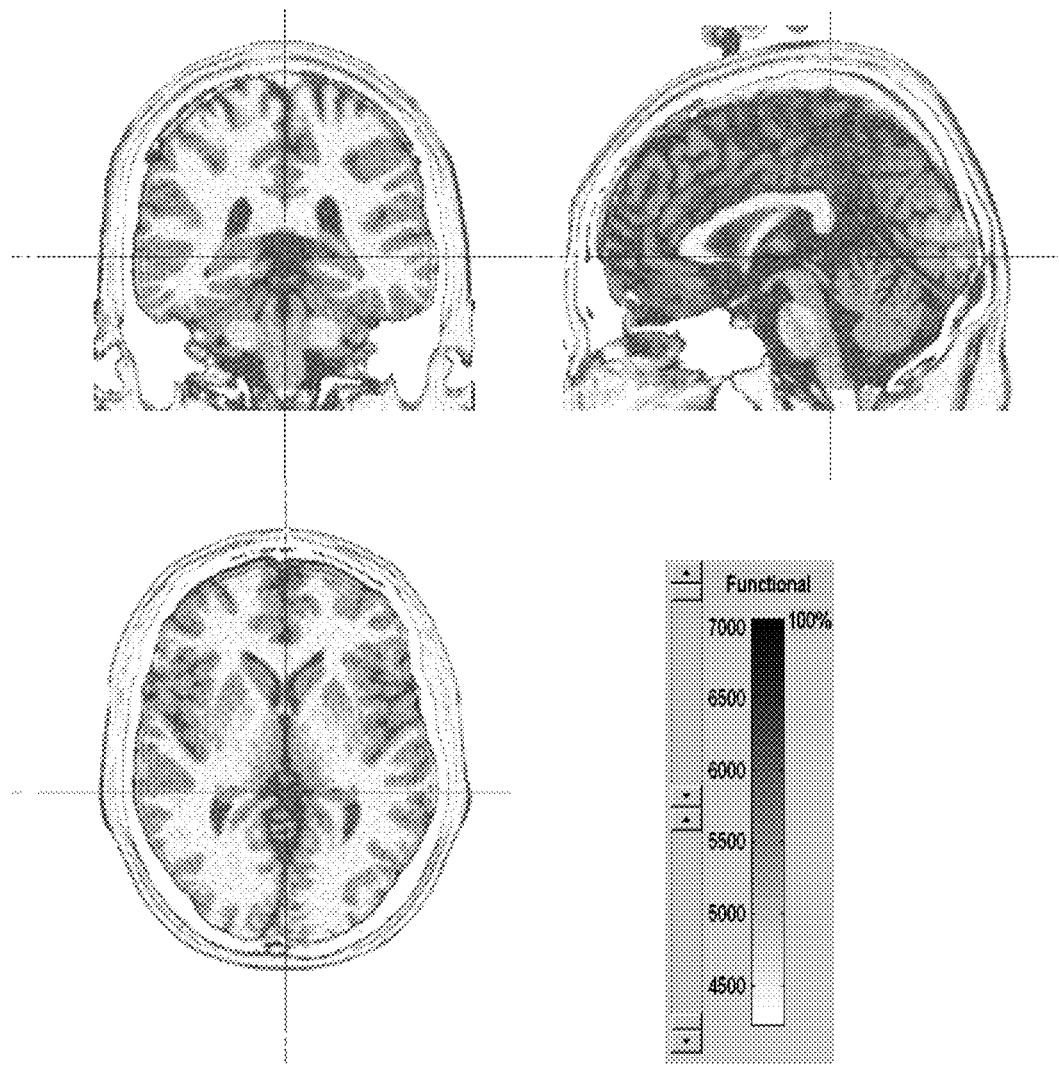
FIG. 11 shows a simple inverse Fourier transform of the data of FIG. 10, revealing two types of artifacts: correlated (not white) noise and ringing at sharp edges.
Figure 12:
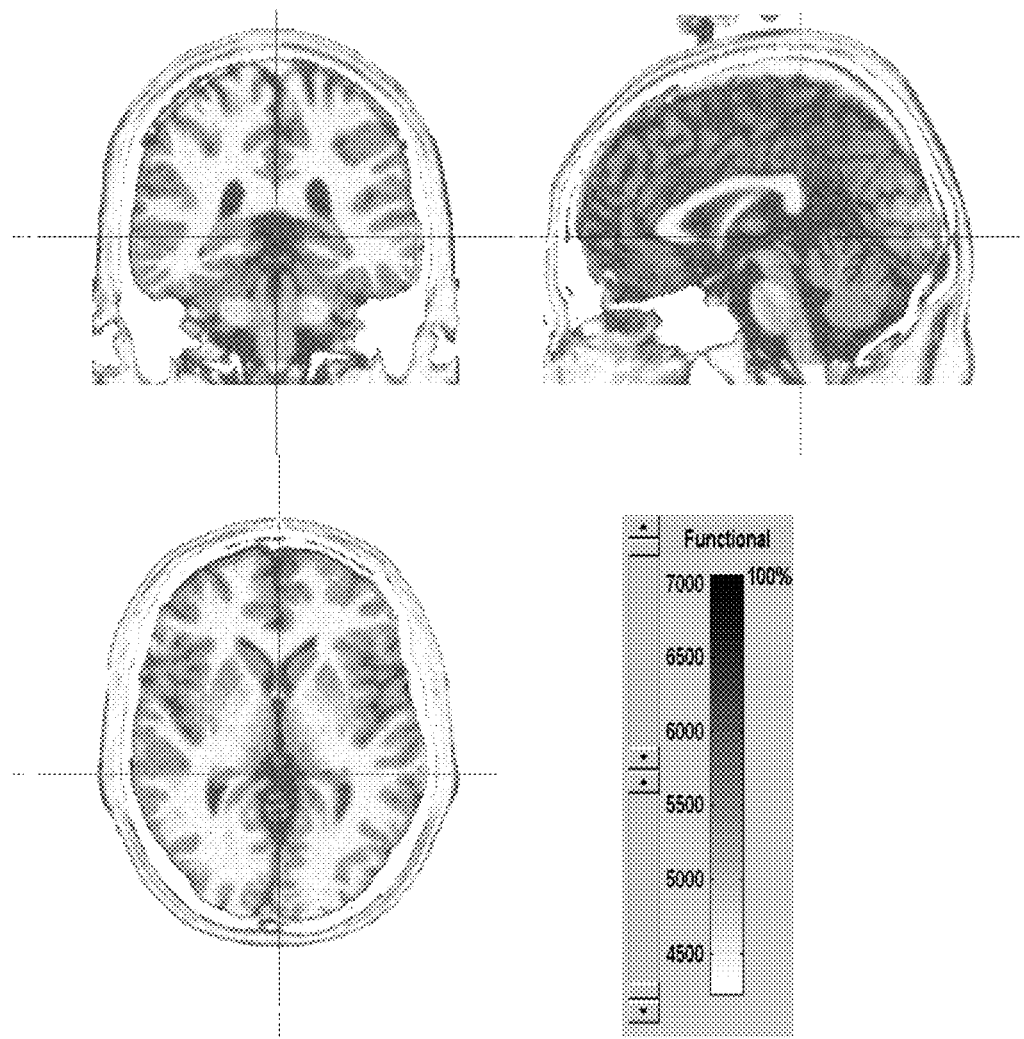
FIG. 12 shows the result of a pixon reconstruction of the data of FIG. 10 with a pixon factor of 0.3.
Figure 13:
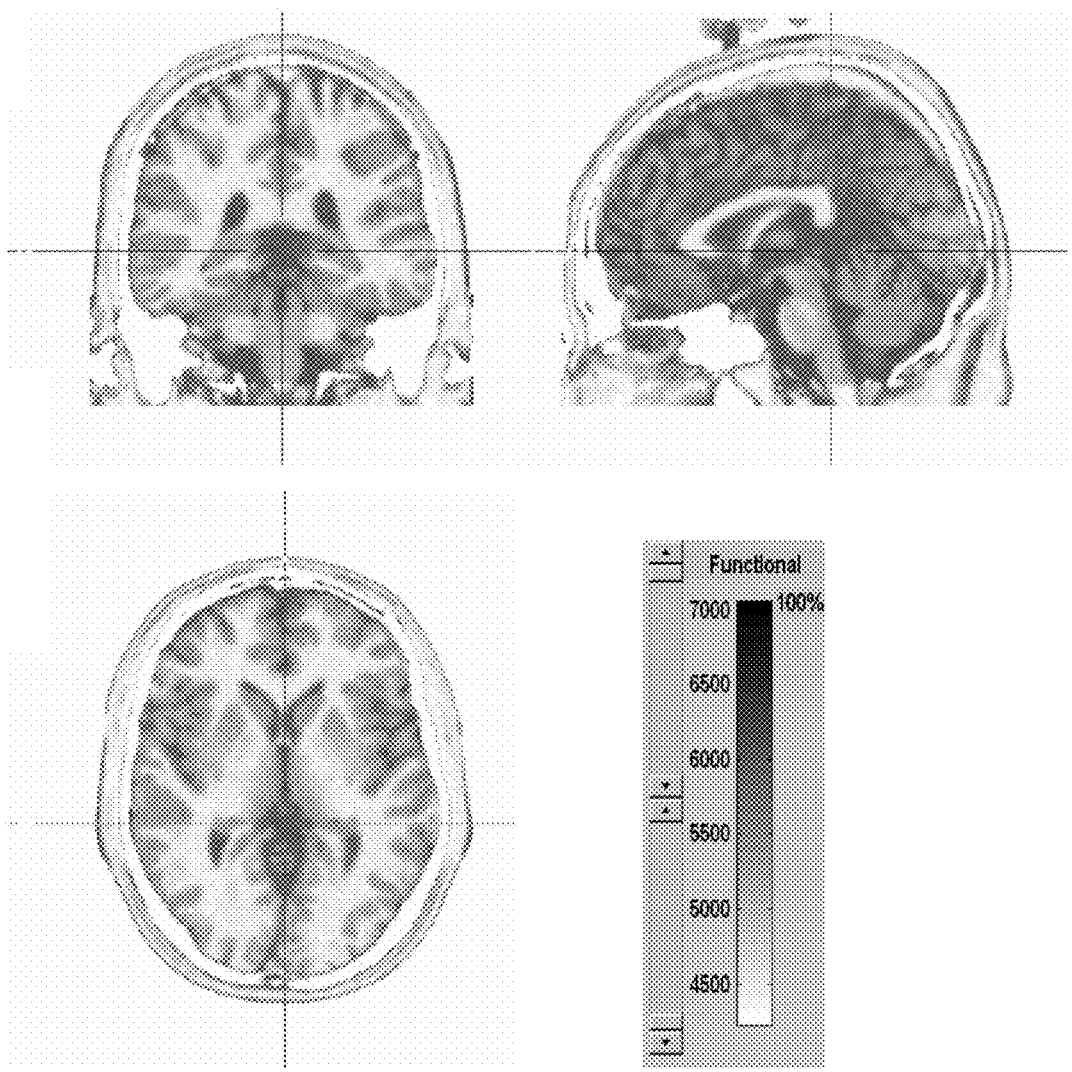
FIG. 13 shows the result of a pixon reconstruction of the data of FIG. 10 with a pixon factor of 0.5.
Figure 14:
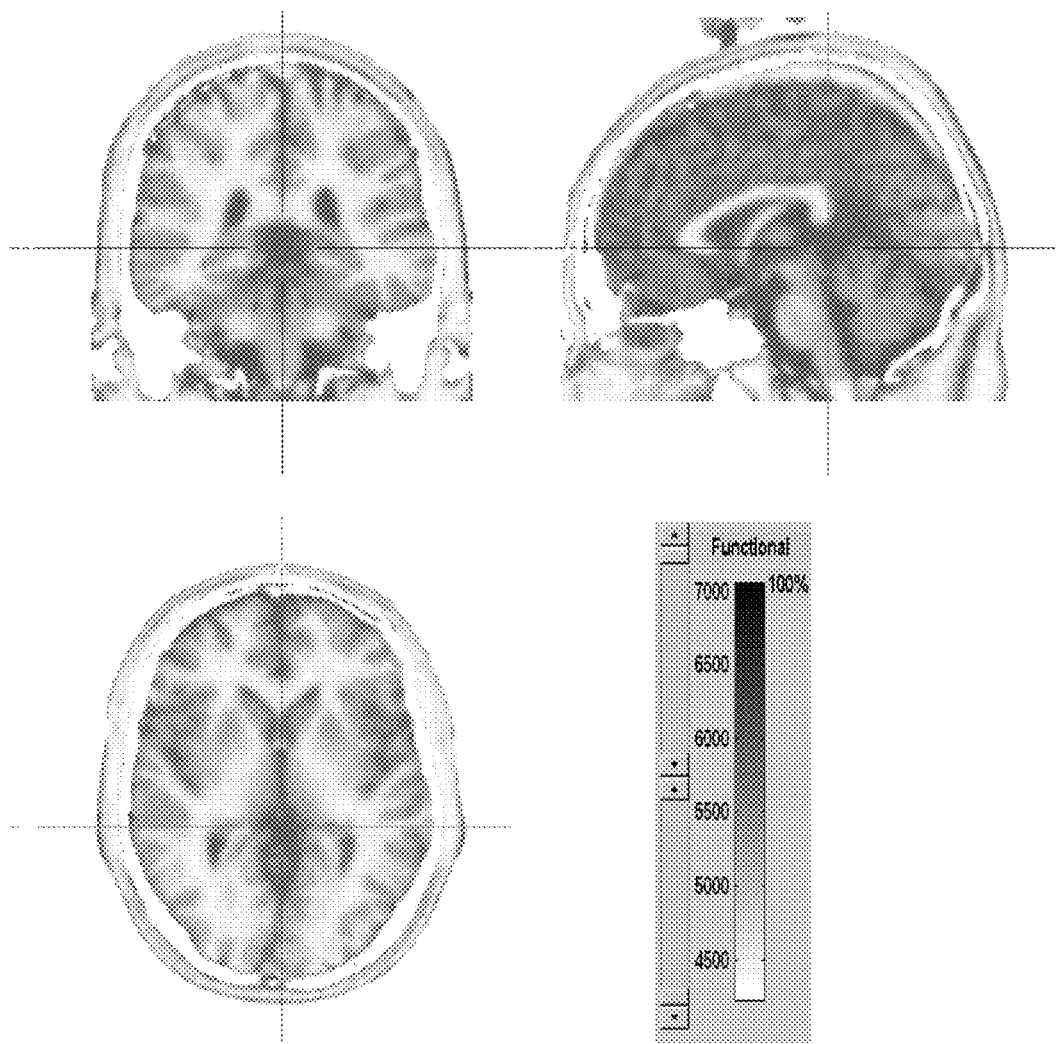
FIG. 14 shows the result of pixon reconstructions of the data of FIG. 10 with a pixon factor 1.0.

FIG. 11 shows a simple inverse Fourier transform of the data, showing two types of artifacts. First, noise is clearly seen all over the image; it is no longer uncorrelated white noise, due to the frequency cutoff of the data. Second, ringing is seen next to sharp edges due to the phenomenon first described by Gibbs (1898, 1899). A nonnegative least-squares (NNLS) fit to the data (not shown) is essentially identical to the direct inverse Fourier transform. The differences between those images show up only in the extracorporal background, which is of little interest and, anyway, very small. More significant image improvements are seen in FIGS. 12-14, which show the result of pixon reconstructions with pixon factors of 0.3, 0.5, and 1.0, respectively. All reconstructions significantly reduce the noise and Gibbs ringing, but not by the same amount. As explained above in the context of Eqs. (25)-(26), there is tradeoff between noise and smoothing, which the user can control with the pixon factor p. A larger p suppresses noise better at the price of some loss of resolution, while a smaller p preserves resolution better at the price of a higher noise level. This tradeoff is evident in FIGS. 12-14, which show progressively stronger smoothing as p is increased, with some resulting loss of resolution.

Example 3

Computed Tomography

Computed tomography (CT) provides a diagnostic and measuring method for medicine and test engineering with the aid of which internal structures of a patient or test object can be examined without needing in the process to carry out surgical operations on the patient or to damage the test object. In this case, there are recorded from various angles a number of projections of the object to be examined from which it is possible to calculate a 3D description of the object.

Tomographic images are produced by converting observed projections (data) into an image. For example, in x-ray CT imaging, x-ray beams are directed at an object and the beams are attenuated by various amounts due to varying structures within the object. On the other side of the object, the attenuated beams are measured with detectors. Such projections are produced at many different angles around the object. Not only are these measurements noisy, the relative noise level depends upon the amount of attenuation. Projections through dense materials, such as bone and especially metal, have lower signal-to-noise ratios than projections through flesh, water, or other less dense materials. Coping with the large and spatially varying fluctuations in the number of detected photons often requires a statistical smoothing technique to improve the image.

In statistical image reconstruction approaches, the problem is posed as finding the images that best fit the measurements according to the (possibly nonlinear) physical model and a statistical model. Proper statistical modeling can lead to lower noise images, thereby enabling reductions in X-ray dose to the patient.

Example 4

Emission Tomography

Emission tomography is a nuclear medicine imaging technique that produces a 3D image of functional processes in the body using tomographic techniques similar to those used in CT. The difference is that a gamma-emitting or positron-emitting radioisotope (called radionuclide) is injected into the bloodstream of the patient. Gamma-emitting radionuclides emit a single photon, and the imaging method is known as single-photon emission computed tomography (SPECT, or sometimes SPET). By contrast, emitted positrons annihilate with electrons in the body to form two photons moving in opposite directions, which are detected in coincidence; the imaging method is known as positron emission tomography (PET).

Most of the time, the marker radioisotope, which is of interest only for its radioactive properties, is attached to a specific ligand to create a radioligand, which is of interest for its chemical binding properties to certain types of tissues. This marriage allows the combination of ligand and radioisotope (the radiopharmaceutical) to be carried and bound to a place of interest in the body, which then (due to the direct or indirect gamma-emission of the isotope) allows the ligand concentration to be imaged.

Nuclear scans are increasingly read alongside CT or MRI scans, with the combination giving both anatomic and metabolic information (i.e., what the structure is, and what it is doing biochemically). Because nuclear imaging is most useful in combination with anatomical imaging, modern nuclear scanners are now available with integrated high-end multi-detector-row CT scanners or, more recently, MRI. Because the two scans can be performed in immediate sequence, or even simultaneously, during the same session, with the patient not changing position between the two types of scans, the two sets of images are more precisely registered, so that areas of abnormality on the nuclear images can be more perfectly correlated with anatomy on the CT or MRI images. This is very useful in showing detailed views of moving organs or structures with higher anatomical variation, which is more common outside the brain.

A technique much like the reconstruction of computed tomography (CT) is commonly used to produce the 3D image, although the data set collected in nuclear imaging has far fewer photons than CT, so reconstruction techniques are more difficult. Pixon processing can then be used to improve image quality and/or reduce the dose injected into the patient.

Example 5

Spectral Analysis

A spectrum analyzer measures the magnitude of an input signal versus frequency within the full frequency range of the instrument. The primary use is to measure the power of the spectrum of known and unknown signals. The input signal a spectrum analyzer measures is electrical, however, spectral compositions of other signals, such as acoustic pressure waves and optical light waves, can be considered through the use of an appropriate transducer. By analyzing the spectra of electrical signals, dominant frequency, power, distortion, harmonics, bandwidth, and other spectral components of a signal can be observed that are not easily detectable in time domain waveforms. These parameters are useful in the characterization of electronic devices, such as wireless transmitters.

Spectrum analyzer types are dictated by the methods used to obtain the spectrum of a signal. There are swept-tuned and fast-Fourier-transform (FFT) based spectrum analyzers: A swept-tuned spectrum analyzer uses a superheterodyne receiver to down-convert a portion of the input signal spectrum (using a voltage-controlled oscillator and a mixer) to the center frequency of a band-pass filter. With a superheterodyne architecture, the voltage-controlled oscillator is swept through a range of frequencies, enabling the consideration of the full frequency range of the instrument. An FFT spectrum analyzer computes the fast Fourier transform, thereby transforming the input signal into the components of its frequency spectrum. Some spectrum analyzers, such as real-time spectrum analyzers, use a hybrid technique where the incoming signal is first down-converted to a lower frequency using superheterodyne techniques and then analyzed using FFT techniques.

This is a 1D example, in which the spectrum (the "image") is related to the input data by a nonlocal Fourier transform. The pixon method can be applied to such data in analogous fashion to the other Fourier examples cited.

REFERENCES

1. Bhatnagar S, Cornwell T J. 2004. Astron. Astrophys. 426: 747-754
2. Biemond J, Lagendijk R L, Mersereau R M. 1990. Proc. IEEE 78:856-883
3. Candès E J, Romberg J, Tao T. 2004, IEEE Tans. Info. Thry. 52:489-509
4. Chaitin G J. 1966. J. Assoc. Comput. Mach. 13:547-569
5. Chen S, Donoho D, Saunders M A. 1999. SIAM J. Sci. Comp. 20:33-61
6. Dempster A P, Laird N M, Rubin D B. 1977. J. R. Stat. Soc. B 39:1-38
7. Donoho D L 2006, Com. Pure Appl. Math. 59:797-829
8. Donoho D L, Tsaig Y, Drori I, Starck J L. 2006. "Sparse Solution of Underdetermined Linear Equations by Stagewise Orthogonal Matching Pursuit", Stanford Technical Report
9. Fisher R A 1912. Messenger Math. 41:155c160
10. Fisher R A 1922. Phil. Trans. Roy. Soc. A 222:309-368
11. Fox L, Huskey H D, Wilkinson J H. 1948. Quart. J. Mech. Appl. Math. 1:149-173
12. Gauss C F 1809. *Theoria Motus Corporum Coelestium in sectionibus conicis solem ambientium*, English translation, 1963. *Theory of Motion of the Heavenly Bodies* (New York: Dover)
13. Gibbs J W. 1898. Nature 59:200
14. Gibbs J W. 1899. Nature 59:606
15. Golub G H, Van Loan C F. 1996. *Matrix Computations*, $3^{rd}$ ed. (Baltimore: Johns Hopkins University Press)
16. Hesse L O. 1876. *Vorlesungen über Analytische Geometric des Raumes, Insbesondere über Oberflächen Zweiter Ordnung*, (Leipzig: Teubner)
17. Hestenes M R, Stiefel E. 1952. J. Res. Nat. Bur. Standards, 49:409-436
18. Hudson H M, Larkin R S. 1994. IEEE Trans. Med. Imag. 13:601-609
19. Kolmogorov A N. 1965. Problems Inf. Transm. 1:4-7
20. Kwan R K S Evans A C Pike G B 1999. IEEE Trans. Med. Imag. 18:1085-97
21. Lange K, Hunter D R, Yang I. 2000. J. Comp. Graph. Statist. 9:1-59
22. Lucy L B. 1974. Astron. J. 79:745-54
23. Mighell K J. 1999. Astrophys. J. 518:380-393
24. Miller, A 2002, *Subset Selection in Regression*, $2^{nd}$ ed., (Boca Raton: Chapman & Hall/CRC)
25. Nyquist H 1928. Trans. AIEE 47:617-644
26. Piña R K, Puetter R C. 1993. Publ. Astron. Soc. Pac. 105:630-637
27. Press W H, Teukolsky S A, Vetterling W T & Flannery B P. 2007. *Numerical Recipes*, $3^{rd}$ ed., (Cambridge: Cambridge University Press)
28. Puetter R C, Gosnell T R & Yahil A 2005. Annu Rev. Astron. Astrophys. 43:139-194
29. Puetter R C, Yahil A. 1999. Astron. Soc. Pac. Conf. Ser. 172:307-316
30. Richardson W. 1972. J. Opt. Soc. Am. 62:55-59
31. Saad Y. 2003. *Iterative Methods for Sparse Linear Systems*, $2^{nd}$ ed. (Philadelphia: SIAM)

32. Shannon C E. 1949. Proc. Institu. Radio Engineers. 37:10-21
33. Shepp L A, Vardi Y. 1982. IEEE Trans. Med. Imaging 1:113-22
34. Solomonoff R J. 1964. Inf. Control 7:1-22
35. Tibshirani R 1996. J. R. Statist. Soc. B 58:267-288
36. Tikhonov A N. 1963. Soviet Math. 4:1035-1038

The invention claimed is:

1. A method for reconstructing an object model from a data set containing noise, the method comprising:
    receiving within a processor the data set defined in a data space, wherein the processor is operable for:
        constructing an object model in an object space wherein the object model comprises a plurality of object points;
        devising a transformation of the object model from object space to data space resulting in a data model, such transformation corresponding to the physical process by which the data are actually obtained;
        selecting a merit function for determining a fit of a data model to the data set;
        determining an updating variable of the object model in object space based upon the merit function;
        smoothing the updating variable to determine a smoothed updating variable by:
            convolving the updating variable with each of a plurality of pixon kernels; and
            selecting for each object point of the input object a pixon kernel having a largest size that meets a predetermined minimum criteria;
        generating a pixon map by assigning indices at each object point of the input object corresponding to the selected pixon kernel; and
        generating an output comprising a substantially denoised object model based on the indices within the pixon map.

2. The method of claim 1, wherein the processor is further operable for smoothing the object model by convolving the object model at each object point with the selected pixon kernel according to the pixon map.

3. The method of claim 1, wherein the merit function is determined using a conjugate gradient method.

4. The method of claim 3, wherein the updating variable is a negradient.

5. The method of claim 3, wherein the processor is further operable for adding a preconditioner.

6. The method of claim 1, wherein the processor is further operable for:
    iteratively smoothing the updating variable and updating the pixon map based upon the iteratively smoothed updating variable until the merit function is optimized.

7. The method of claim 1, wherein the processor is further operable for, after the step of convolving the updating variable, subtracting the updating variable to determine an updating variable change.

8. The method of claim 7, wherein the predetermined minimum criteria is based on the ratio between the square of the updating variable change and a variance of the updating variable.

9. The method of claim 1, wherein the data set comprises interferometric data generated in conjunction with an analysis process selected from the group consisting of aperture synthesis, interferometric synthetic aperture radar (IfSAR or InSAR), synthetic aperture radar (SAR) and inverse synthetic aperture radar (ISAR), synthetic aperture sonar, beamforming, and synthetic aperture magnetometry.

10. The method of claim 1, wherein the data set comprises magnetic resonant imaging data.

11. The method of claim 1, wherein the data set comprises computed or emission tomography data.

12. The method of claim 1, wherein the data set comprises spectral analysis data.

13. The method of claim 1, wherein the data set comprises a plurality of input signals from different instruments, and the denoised object model comprises a single output corresponding to a mixture of the input signals.

14. A non-transitory computer readable medium having included software thereon, the software including instructions for reconstructing an input signal from a data set containing noise, the instructions comprising:
    receiving the data set defined in a data space;
    constructing an object model in an object space wherein the object model comprises a plurality of object points;
    devising a transformation of the object model from object space to data space resulting in a data model, such transformation corresponding to the physical process by which the data are actually obtained;
    selecting a merit function for determining a fit of a data model to the data set;
    determining an updating variable of the object model in object space based upon the merit function;
    smoothing the updating variable to determine a smoothed updating variable by:
        convolving the updating variable with each of a plurality of pixon kernels; and
        selecting for each object point of the input object a pixon kernel having a largest size that meets a predetermined minimum criteria; and
    generating a pixon map by assigning indices at each object point of the input object corresponding to the selected pixon kernel.

15. The non-transitory computer readable medium of claim 14, further comprising smoothing the data set by convolving the data set at each location with the selected pixon kernel according to the pixon map.

16. The non-transitory computer readable medium of claim 14, wherein the merit function is determined using a conjugate gradient method.

17. The non-transitory computer readable medium of claim 16, wherein the updating variable is a negradient.

18. The non-transitory computer readable medium of claim 17, further comprising adding a preconditioner.

19. The non-transitory computer readable medium of claim 14, further comprising:
    iteratively smoothing the updating variable and updating the pixon map based upon the iteratively smoothed updating variable until the merit function is optimized.

20. The non-transitory computer readable medium of claim 19, further comprising, after the step of convolving the updating variable, subtracting the updating variable to determine an updating variable change.

21. The method of claim 20, wherein the predetermined minimum criteria is based on the ratio between the square of the updating variable change and a variance of the updating variable.

* * * * *

UNITED STATES PATENT AND TRADEMARK OFFICE
CERTIFICATE OF CORRECTION

Page 1 of 1

PATENT NO. : 8,675,983 B2
APPLICATION NO. : 13/448363
DATED : March 18, 2014
INVENTOR(S) : Amos Yahil It is certified that error appears in the above-identified patent and that said Letters Patent is hereby corrected as shown below:

In the Claims

Col. 22, Claim 21, line 1: "method" should be changed to -- non-transitory computer readable medium --.

Signed and Sealed this
Tenth Day of June, 2014

Michelle K. Lee
*Deputy Director of the United States Patent and Trademark Office*

UNITED STATES PATENT AND TRADEMARK OFFICE
CERTIFICATE OF CORRECTION

| | |
|---|---|
| PATENT NO. | : 8,675,983 B2 |
| APPLICATION NO. | : 13/448363 |
| DATED | : March 18, 2014 |
| INVENTOR(S) | : Amos Yahil |

It is certified that error appears in the above-identified patent and that said Letters Patent is hereby corrected as shown below:

In the Claims

Col. 22, Claim 21, line 59: "method" should be changed to -- non-transitory computer readable medium --.

This certificate supersedes the Certificate of Correction issued June 10, 2014.

Signed and Sealed this
Fifteenth Day of July, 2014

Michelle K. Lee
*Deputy Director of the United States Patent and Trademark Office*